United States Patent [19]
Rafalovich et al.

[11] Patent Number: 5,871,041
[45] Date of Patent: Feb. 16, 1999

[54] THERMAL ENERGY STORAGE AND DELIVERY APPARATUS AND VEHICULAR SYSTEMS INCORPORATING SAME

[75] Inventors: Alexander P. Rafalovich; Michael D. Fritz; Gilbert P. Keller, all of Indianapolis, Ind.

[73] Assignee: Mid-America Capital Resources, Inc., Indianapolis, Ind.

[21] Appl. No.: 719,928

[22] Filed: Sep. 25, 1996

[51] Int. Cl.$^6$ ....................................... F25B 29/00
[52] U.S. Cl. ........................... 165/10; 165/48.1; 165/236; 165/41; 165/43; 165/202; 62/406; 62/430; 62/393
[58] Field of Search ............................... 62/406, 430, 393; 165/236, 10, 48.1, 41, 42, 43, 202

[56] References Cited

U.S. PATENT DOCUMENTS

| | | | |
|---|---|---|---|
| 2,191,519 | 2/1940 | Cornell, Jr. | 62/406 |
| 2,216,175 | 10/1940 | Helbing, Jr. | 165/48.1 |
| 2,237,332 | 4/1941 | Bretzlaff et al. | 62/90 |
| 2,819,044 | 1/1958 | Bungas | 165/236 |
| 3,156,101 | 11/1964 | McGuffey | 62/430 |
| 3,228,205 | 1/1966 | Franklin | 62/406 |
| 3,585,812 | 6/1971 | Parker | 62/406 |
| 4,761,967 | 8/1988 | Sumikawa et al. | 62/430 |
| 5,054,540 | 10/1991 | Carr | 165/10 |
| 5,277,038 | 1/1994 | Carr | 62/434 |
| 5,553,662 | 9/1996 | Longardner et al. | 165/202 |

FOREIGN PATENT DOCUMENTS

| | | | |
|---|---|---|---|
| 2942147 | 6/1981 | Germany | 165/10 A |
| 0247856 | 11/1986 | Japan | 165/10 A |

*Primary Examiner*—John K. Ford
*Attorney, Agent, or Firm*—Woodard, Emhardt, Naughton, Moriarty & McNett

[57] ABSTRACT

A preferred thermal energy storage and delivery unit includes a chamber for containing a phase change material and one or more air channel members which pass through the phase change material for conveying air into heat exchange relationship with the phase change material. The unit also includes a fluid circuit for conveying a thermal potential charging fluid, for example engine coolant or refrigerant, into heat exchange relationship with the phase change material. The unit optionally may include a fluid circuit through which engine coolant passes, and a fluid circuit through which refrigerant passes. In this manner, systems which incorporate the unit and selectively provide heated or cooled air to condition an interior vehicle space are provided. Also described are improved vehicular environmental conditioning systems which include a front HVAC unit and a rear thermal storage apparatus, and which are flexibly operated in a number of environmental conditioning and/or thermal storage modes.

12 Claims, 6 Drawing Sheets

THERMAL ENERGY STORAGE AND DELIVERY APPARATUS AND VEHICULAR SYSTEMS INCORPORATING SAME

BACKGROUND OF THE INVENTION

The present invention relates to a thermal energy storage and delivery apparatus and a vehicular environmental control system incorporating the apparatus.

As background, the use of heating and cooling systems for vehicular applications is common and well established to maintain a comfortable environment within the vehicle while the vehicle engine is operating. When the occupants of the vehicle stop driving to rest, the interior space in the vehicle can become very uncomfortable due to the air temperature within the vehicle increasing or decreasing. In most vehicles, the heating and cooling system maintains comfort levels within the vehicle only during engine operation. These heating and cooling systems do not provide space conditioning to the interior of the vehicle when the engine is turned off.

Phase change materials ("PCMs") store heat during phase transition, typically liquid/solid phase transitions. For example, water, paraffins, alcohol, salts and salt hydrates have notably high energy densities over temperature ranges of practical significance. A large amount of thermal energy can be stored as latent heat of fusion during the melting of an appropriate PCM. The stored heat can then be extracted from the liquid PCM by cooling it until it solidifies. Thermal energy can also be stored as sensible heat in PCMs. Various attempts have been made to incorporate PCMs into heating and air conditioning systems, including heat pump systems, solar collection systems, and more conventional heating and air conditioning systems. For example, U.S. Pat. No. 5,054,540 to Carr describes a cool storage reservoir positioned in the air duct of a vehicle or the like. A plurality of elongated sealed containers are positioned in the cool storage reservoir, each of the sealed containers being filled with a gas/water medium capable of forming a gas hydrate. U.S. Pat. No. 5,277,038 to Carr also implements a thermal storage system into a vehicle using gas hydrates.

Gas hydrates, however, may possess a variety of disadvantages. Gas hydrates suffer from the development of significant pressures during decomposition and may be subject to excessive supercooling. They may also require specific devices to initiate nucleation. Another disadvantage of the U.S. Pat. No. 5,277,038 patent is that the vehicle's air distribution system is required to discharge the stored thermal energy. The vehicle air distribution system has a high power blower which drains power out of the batteries very fast. Further, the U.S. Pat. No. 5,277,038 patent discloses storing high and low temperature thermal energy of the same temperature. This does not permit the system of the U.S. Pat. No. 5,277,038 patent to provide comfortable thermal conditioning of a vehicle interior. In addition, the system disclosed in the U.S. Pat. No. 5,277,038 patent is not compatible with electric powered vehicles (EV) which don't have vehicle heating and cooling systems.

Another example is the "heat battery" designed to provide "instant" heating to a vehicle cabin. (Automotive Engineering, Vol. 100, No. 2, February, 1992). The core of the heat battery includes a series of flat, sheet metal PCM envelopes in spaced-apart relationship. The heat battery and an electric coolant pump are installed in a coolant line running from the engine to the cabin heater, forming a closed circuit capable of very rapidly heating the cabin when the engine is turned on.

U.S. Pat. No. 5,553,662 describes a thermal energy storage system operable in various heating capacity storage and discharge modes for maintaining a temperature in a vehicle compartment. Generally, the systems described in this '662 patent represent improvements over prior known systems. In the specific system disclosed, an extra pump is used in the operation of the thermal storage system, and air is circulated around the exterior of the chamber containing the thermal storage medium to recover positive or negative thermal potential. In addition, the specific thermal storage system described is not operable to condition the vehicle compartment when the engine is running, and it is not configured in a fashion which allows for discharge of the thermal storage system and simultaneous operation of the vehicle's HVAC system.

In light of this background, there remains a need for thermal storage system designs which can be operated flexibly, alone or in conjunction with conventional HVAC units, and which possess improved heat transfer properties. The present invention is addressed to these needs.

SUMMARY OF THE INVENTION

According to the present invention, a thermal energy storage apparatus is provided for use in a vehicular environmental conditioning system. The apparatus includes a housing having a chamber for containing a volume of thermal storage medium, and a heat exchange coil positioned to pass through a volume of thermal storage medium contained in the chamber, for conveying a fluid into heat exchange relationship with the thermal storage medium so as to impart positive or negative thermal potential to the thermal storage medium. The apparatus includes one or more air channel members positioned to pass through the volume of thermal storage medium, for conveying air into heat exchange relationship with the thermal storage medium to extract positive or negative thermal potential from the thermal storage medium. The preferred air channel members have surface means, for instance internal fins, for increasing heat exchange between air passing through the channel members and thermal storage medium contacting exterior surfaces of the channel members. In a preferred form, the apparatus includes both a first coil positioned to pass through the thermal storage medium for carrying coolant of the vehicle, and a second coil positioned to pass through the thermal storage medium for carrying refrigerant of an air conditioning system of the vehicle. In this fashion, the thermal storage apparatus can be used in either a heating or cooling function. Preferred apparatuses also include a first air manifold defined in the housing and communicating with inlet openings of the channel members, the first air manifold having an air intake opening; a second air manifold defined in the housing and communicating with outlet openings of the channel members, wherein the second air manifold has an air discharge opening; and, an air moving device such as a fan to power the flow of air through the air intake opening, into first air manifold, through the channel members, into the second air manifold, and out the air discharge opening More preferably, a first fan is associated with the air intake opening of the first air manifold, and operable to create a forced air flow into the first air manifold and into the inlet openings of the channel members. A second fan is associated with the air discharge opening of the second air manifold, and operable is to create a forced air flow out of the outlet openings of the channel members and out of the second air manifold. In addition, preferred air manifold configurations have increasing cross sectional dimensions in a direction extending toward their respective air intake and discharge openings, which allows for both space-utilization efficiency and improved air flow to the apparatus. For example, in apparatuses wherein the housing is generally rectangular in cross section, the generally triangular air manifolds can flank a generally trapezoidal chamber for the thermal storage medium, and thereby house a relatively large volume of thermal storage medium in the rectangular space, as compared to a configuration in which the manifolds and chamber are all rectangular in cross section.

One feature of a thermal storage and delivery apparatus in accordance with the present invention is that the air flow, refrigerant flow and coolant flow all circulate through the thermal storage medium in the thermal storage apparatus. This feature permits not only the hot coolant and cool refrigerant to be in direct contact with the PCM, but also the air to be conditioned. This optimizes heat transfer between the PCM and the both charging fluids (coolant or refrigerant) and discharging fluid (air). Advantageously, the thermal energy storage system is a modular and self-sufficient component requiring connection only to the vehicle's coolant system and refrigerant lines. Further, it is configured for both new and retrofit installations.

In another preferred embodiment, the invention provides an environmental control system for conditioning an environment of an interior of a vehicle. The system includes a first source of charging fluid, for instance coolant or refrigerant, for carrying positive or negative thermal potential generated during a charging cycle. A thermal storage apparatus is provided having a housing having an interior chamber containing a volume of thermal storage medium. A first fluid circuit passes through the volume of thermal storage medium, with the source of charging fluid being coupled to the first fluid circuit, for delivering the positive or negative thermal potential to the thermal storage medium. One or more air channel members also pass through said volume of thermal storage medium, and an air moving device is provided to power the passage of air through the air channel member(s), for recovering the positive or negative thermal potential delivered to the thermal storage medium by the charging fluid. In addition, a second fluid circuit is preferably provided passing through the volume of thermal storage medium and coupled to a second source of charging fluid, and the system can be adapted to selectively circulate the first charging fluid (e.g. engine coolant) and the second charging fluid (e.g. refrigerant) respectively through the first and second fluid circuits, to selectively provide positive thermal potential or negative thermal potential to the thermal storage medium.

In another embodiment of the invention, provided is an environmental conditioning system for a vehicle compartment having front and rear spaces to occupy. The system of the invention includes (a) a first coolant loop including an engine and a heater coil, the first coolant loop being adapted to circulate hot coolant from the engine to the heater coil to provide positive thermal potential to the heater coil when the engine is on. The system further includes (b) a first refrigerant loop having a compressor, a condenser, a filter-dryer, a metering device, and an evaporator, the compressor being operable when activated to circulate refrigerant in the first refrigerant loop to provide negative thermal potential to the evaporator. A front vehicle air supply apparatus (c) is provided including an air inlet, an air outlet, the heater coil, the evaporator, and a first air moving device adapted when activated to move air into the air inlet, against the evaporator and heater coil, and out the air outlet, to deliver to the front space of the compartment positive thermal potential from the heater coil, negative thermal potential from the evaporator, or ventilation. A thermal energy storage apparatus (d) of the system includes an enclosed volume of thermal storage medium adapted to store at least one of negative and positive thermal potential, a second coolant loop including a coolant coil passing through the thermal storage medium and arranged in communication with the first coolant loop to circulate hot coolant through the coolant coil when the engine is on to provide positive thermal potential to the thermal storage medium. The thermal energy storage apparatus (d) also includes a second refrigerant loop including a refrigerant coil passing through the thermal storage medium and arranged in communication with the first refrigerant loop to circulate refrigerant through the refrigerant coil when the compressor is activated to provide negative thermal potential to the thermal storage medium. The environmental control system includes (e) a second air moving device adapted when activated to move air into heat exchange relationship with the thermal storage medium to recover positive or negative thermal potential from the thermal storage medium and deliver the same to the rear space of the compartment. Also incorporated are various valve means, including (f) first coolant valve means adapted to selectively allow or interrupt circulation of coolant in the first coolant loop to the heater coil; (g) second coolant valve means adapted to selectively allow or interrupt circulation of coolant in the second coolant loop to the coolant coil; and (h) first refrigerant valve means adapted to selectively allow or interrupt circulation of refrigerant in the first refrigerant loop to the evaporator. An environmental control system controls (a)–(h) to select any one of several modes of operation, including:

(1) a simultaneous front/rear heating mode when the engine is on, in which the compressor is deactivated, the first air moving means is activated, the first coolant valve means is positioned to allow the circulation of engine coolant to the heater coil, the second coolant valve means is positioned to allow the circulation of coolant to the coolant coil to provide positive thermal potential to the thermal storage medium, and the second air moving device is deactivated to store the provided positive thermal potential in the thermal storage medium, or activated to deliver at least a portion of the provided positive thermal potential to the rear space of the compartment;

(2) a simultaneous front/rear cooling mode when the engine is on, in which the compressor and the first air moving means are activated, the first refrigerant valve means is positioned to allow the circulation of refrigerant to the evaporator, the first coolant valve means is positioned to interrupt the circulation of coolant to the heater coil, the second coolant valve means is positioned to interrupt the circulation of coolant to the coolant coil, and the second air moving device is activated to deliver at least a portion of the negative thermal potential to the rear space of the compartment;

(3) a front-heating/rear-cooling mode when the engine is on, in which the first coolant valve means is positioned to allow the circulation of coolant to the heater coil, the first air moving means is activated to provide positive thermal potential to the front space, the compressor is activated, the first refrigerant valve means is positioned to interrupt the circulation of refrigerant to the evaporator, the second coolant valve means is positioned to interrupt the circulation of coolant to the coolant coil; and the second air moving device can be deactivated to store provided negative potential in the thermal storage medium or activated to deliver at least a portion of the provided negative potential to the rear space of the compartment;

(4) a front-heating-only mode when the engine is on, in which the first air moving means is activated, the compressor is deactivated, the first coolant valve means is positioned to allow the circulation of coolant to the heater coil, and the second coolant valve means is positioned to interrupt the circulation of coolant to the coolant coil;

(5) a front-cooling-only mode when the engine is on, in which the compressor is activated, the first refrigerant valve means is positioned to allow the circulation of refrigerant to the evaporator, and the first and second coolant valve means are positioned to interrupt the circulation of coolant to the heater coil and the coolant coil, respectively;

(6) a rear-heating-only mode when the engine is on, in which the first air moving means and the compressor are deactivated, the second air moving means is activated, the first coolant valve means is positioned to interrupt the circulation of coolant to the heater coil, and the second coolant valve means is positioned to allow the circulation of coolant to the coolant coil;

(7) a rear-cooling-only mode when the engine is on, in which first air moving means is deactivated, the compressor is activated, the first refrigerant valve means is positioned to interrupt refrigerant flow to the evaporator, the first and second coolant valve means are positioned to interrupt the circulation of coolant to the heater coil and coolant coil, respectively, and the second air moving means is activated to deliver at least a portion of the negative thermal potential provided to the thermal storage medium to the rear space (while possibly also storing a portion in the thermal storage medium), or deactivated to store the negative thermal potential provided to the thermal storage medium; or (8) a discharge mode when the engine is off, in which the second air moving device is activated to recover positive or negative thermal potential stored in the thermal storage medium and deliver the same to the rear space of the compartment.

The second air moving device preferably has first and second settings adapted to move air at respective first and second rates, and the system is arranged such that operation of the second air moving device at the first setting provides for the storage of a portion of positive or negative thermal energy being provided to the thermal storage medium when the engine is on, and operation of the second air moving device at the second setting delivers all of the positive or negative thermal potential being provided to the thermal storage medium to the rear space of the compartment. The environmental control system controls the second air moving device to select the first or second setting. The environmental conditioning system also in a preferred form includes second refrigerant valve means adapted to selectively allow or interrupt refrigerant flow in the second refrigerant loop to the refrigerant coil, wherein the environmental control system also controls the second refrigerant valve means to select, in addition to modes 1–8 above:

a front-cooling/rear-heating mode when the engine is on, in which the compressor is activated, the first refrigerant valve means is positioned to allow the circulation of refrigerant to the evaporator, the second refrigerant valve means is positioned to interrupt the circulation of refrigerant to the refrigerant coil, the first coolant valve means is positioned to interrupt the circulation of coolant to the heater coil, and the second coolant valve means is positioned to allow the circulation of coolant to the coolant coil to provide positive thermal potential to the thermal storage medium.

The invention also provides vehicles having environmental conditioning systems of the invention. Illustrative vehicles include tractors, passenger vehicles, electric vehicles (EVs), and hybrid electric vehicles (HEVs), any of the above optionally including a flywheel to store energy.

Additional objects, features, and advantages of the invention will become apparent to those skilled in the art upon consideration of the following detailed description of preferred embodiments exemplifying the best mode of carrying out the invention as presently perceived.

BRIEF DESCRIPTION OF THE FIGURES

The detailed description particularly refers to the accompanying figures in which.

DETAILED DESCRIPTION OF THE INVENTION

For the purposes of promoting an understanding of the principles of the invention, reference will now be made to embodiments thereof and specific language will be used to describe the same. It will nevertheless be understood that no limitation of the scope of the invention is thereby intended, such alterations, further modifications and applications of the principles of the invention as described herein being contemplated as would normally occur to one skilled in the art to which the invention pertains.

As disclosed above, preferred embodiments of the invention provide thermal storage and delivery apparatuses and vehicular environmental conditioning systems and methods which can utilize the apparatuses. Generally speaking, environmental conditioning systems of the invention store thermal potential generated during a charging cycle, and later release the thermal potential to condition the interior environment of the vehicle, for example providing heating or cooling function.

Figure 1:
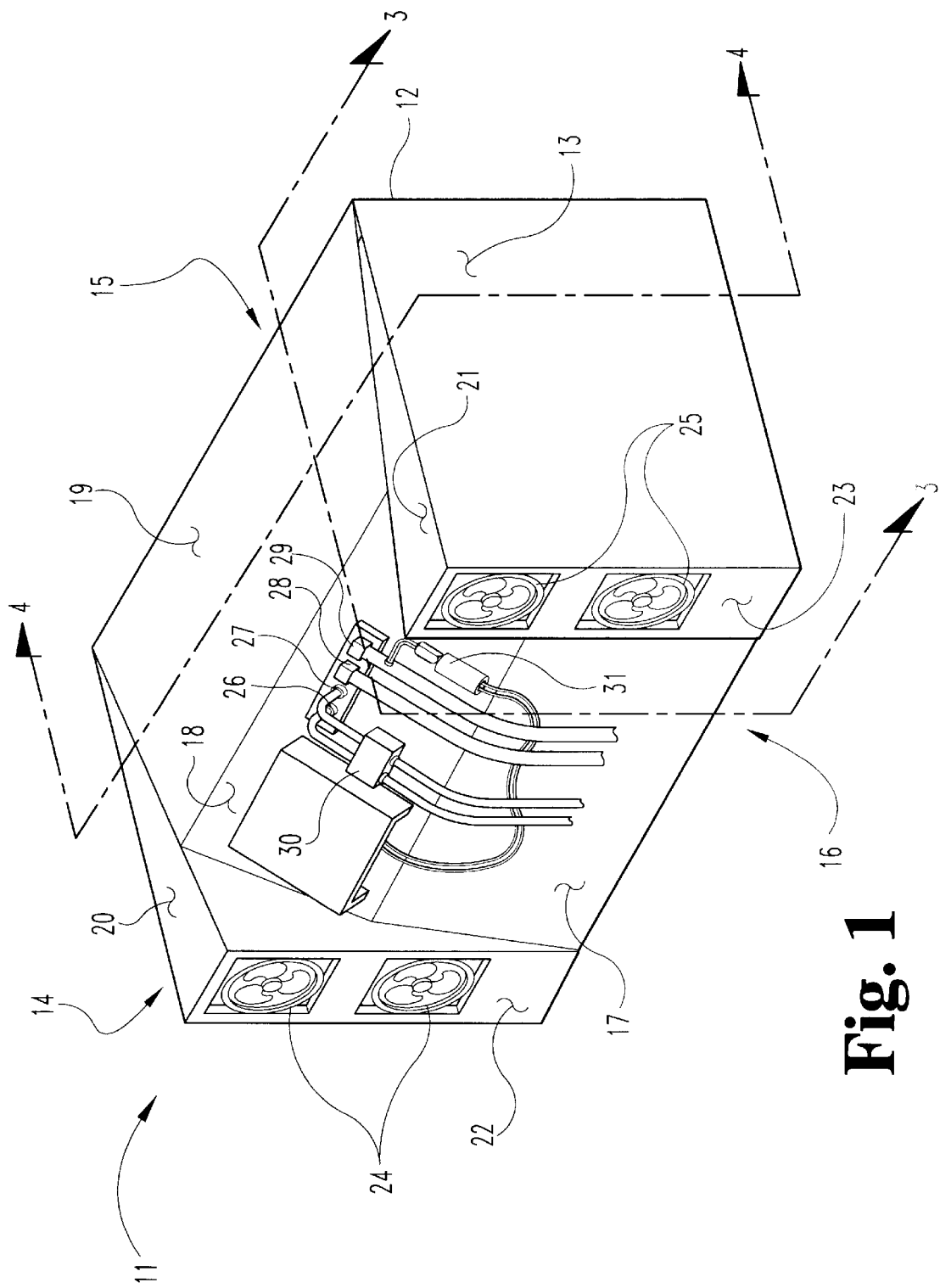
FIG. 1 is a perspective view of a thermal energy storage and delivery apparatus for a vehicle or the like, in accordance with the present invention.

Referring now to FIG. 1, shown is a perspective view of a thermal storage and delivery apparatus 11 of the present invention. Apparatus 11 generally includes a housing 12 having rectangular side walls 13 and 14, which intersect and are adjoined to generally rectangular rear wall 15 at right angles. Generally rectangular bottom wall 16 is adjoined to the lower ends of side walls 13 and 14 and rear wall 15 again at right angles. The front portion of housing 12 is formed of several walls to facilitate placement of certain components on the housing 12. Included is lower wall 17 which intersects and adjoins bottom wall 16 at a first angle less than 90°.

The upper end of wall 17 is adjoined to the lower end of wall 18, which, relative to bottom wall 16, is positioned at a second angle which is less than the first angle. Walls 16 and 17 together thus form a generally "V"-shaped front wall. The upper wall of housing 12 includes a generally trapezoidal wall 19 bounded by generally triangular walls 20 and 21, which together seal the top of the housing. Front walls 22 and 23 span between triangular top walls 20 and 21 and bottom wall 16, sealing the outer ends of the front of housing 12. Front wall 22 includes two openings in which are housed air intake fans 24. Similarly, front wall 23 includes openings in which are housed air discharge fans 25. Front wall 18 defines two refrigerant openings through which extend refrigerant input line 26 and refrigerant exit line 27. Front wall 18 defines two further openings through which extend engine coolant input line 28 and engine coolant exit line 29. A metering device such as a thermal expansion valve 30 is associated with refrigerant input line 26. A valve 31 is operably associated with coolant line 29.

It will be understood that the shape of apparatus 11 depicted in FIG. 1 is a preferred, but that other convenient configurations can be used. For instance, the air manifolds and thermal storage medium chamber may all be generally rectangular in cross section, and/or the front walls 17 and 18 may be replaced by a single wall mounted perpendicularly to top wall 19 and bottom wall 16. Likewise, it will be understood that thermal expansion valve 30 and valve 31 need not be mounted to the housing 12, and may be installed elsewhere in an environmental conditioning system incorporating the other components of apparatus 11, if desired.

Figure 2:
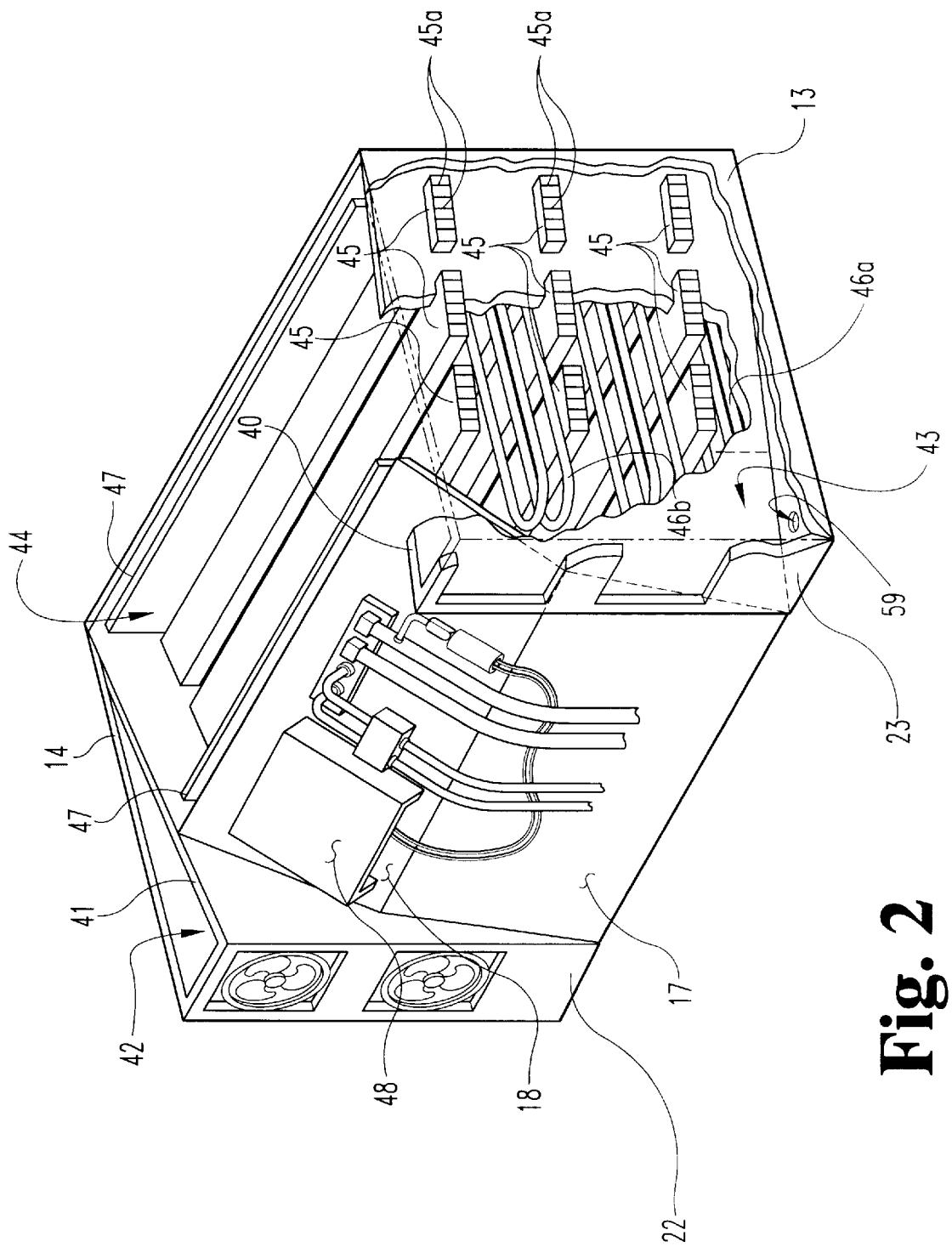
FIG. 2 is a perspective view of the apparatus of FIG. 1 with portions broken away to show interior spaces of the apparatus.

Referring now to FIGS. 1 and 2 together, shown in FIG. 2 is a perspective cut away view of apparatus 11 of FIG. 1. In particular, FIG. 2 depicts apparatus 11 having top walls 19, 20 and 21 removed, and portions of walls 13 and 23 cut away, to illustrate the interior of device 11. Shown is interior wall 40 which together with front wall 23, side wall 13, bottom wall 16, and top wall 21 (FIG. 1), forms a generally triangular chamber which serves as an air discharge manifold 43. In a like manner, interior wall 41 together with side wall 14, front wall 22, bottom wall 16 and top wall 20 (FIG. 1), form a chamber which is generally triangular in cross section and which functions as an air intake manifold 42. A chamber 44 for containing a thermal storage medium, for example an aqueous thermal storage medium, is formed by rear wall 15, interior walls 40 and 41, front walls 17 and 18, and bottom wall 16. Chamber 44 is generally trapezoidal in cross section, and together with air intake manifold 42 and air discharge manifold 43 form a generally rectangular structure. This configuration of chambers provides a rectangular device for ready retrofit into a rectangular space, and as well increases the capacity of chamber 44 to contain thermal storage medium as compared to a corresponding apparatus wherein manifolds such as 42 and 43 and chamber 44 are all rectangular. Moreover, the triangular cross section of manifolds 42 and 43 provides a generally increasing cross-sectional dimension extending toward fans 24 and 25 located on front walls 22 and 23, respectively, which improves air flow through the device 11.

A plurality of air channel members 45 are mounted to and extend between interior walls 40 and 41, thus passing through chamber 44 adapted to contain the thermal storage medium. Thus, an air flow path is created from fans 24, through air intake manifold 42, through air channel members 45, into air discharge manifold 43, and out through fans 25. It has been found in this regard that it is preferable to have fans 24 pushing air through this flow path, and fans 25 pulling air through this flow path. This creates an increased air flow as compared, for example, to a configuration in which the same four fans are positioned on wall 22 to only push air through the flow path, or to a corresponding arrangement in which the fans are used only to pull air through the flow path.

In order to increase the efficiency of heat transfer between air passing through air channel members 45 and the thermal storage medium contained in chamber 44, air channel members 45 are equipped with internal fins 45a, which provide increased surface area for air to contact a thermally conductive material (e.g. metal such as extruded aluminum) from which the members 45 were made. Thus, interior configurations of channel members 45 other than smooth walls would be preferred, including for example fins as illustrated, corrugations or other surface-increasing geometries. It will also be understood that channel members 45 may have modified exterior surfaces as well, to provide increased exterior surface area for contacting thermal storage media, and may pass through the thermal storage medium at any angle, including for example perpendicularly to that which is illustrated in FIGS. 2–4.

Also housed within chamber 44 is at least one coil, and preferably two coils 46a and 46b, one for each refrigerant circulation and engine coolant circulation. Such coils are, of course, connected to refrigerant input and output lines 26 and 27, and coolant input and output lines 28 and 29. A number of sheet metal or similar support walls 47 can also be provided in chamber 44 to serve to support coils 46a and 46b housed in chamber 44, as is common practice in the construction and installation of such coils. Protective panel 48 may also be provided on the exterior of wall 18, to house electronics or other devices associated with the function of apparatus 11.

Figure 3:
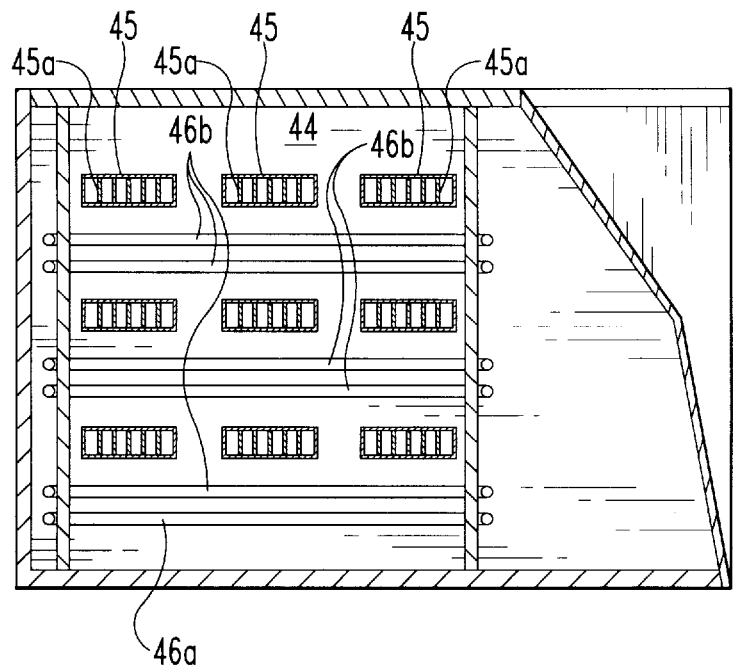
FIG. 3 is a cross-sectional view of the apparatus of FIG. 1 taken along line 3—3 and viewed in the direction of the arrows.
Figure 4:
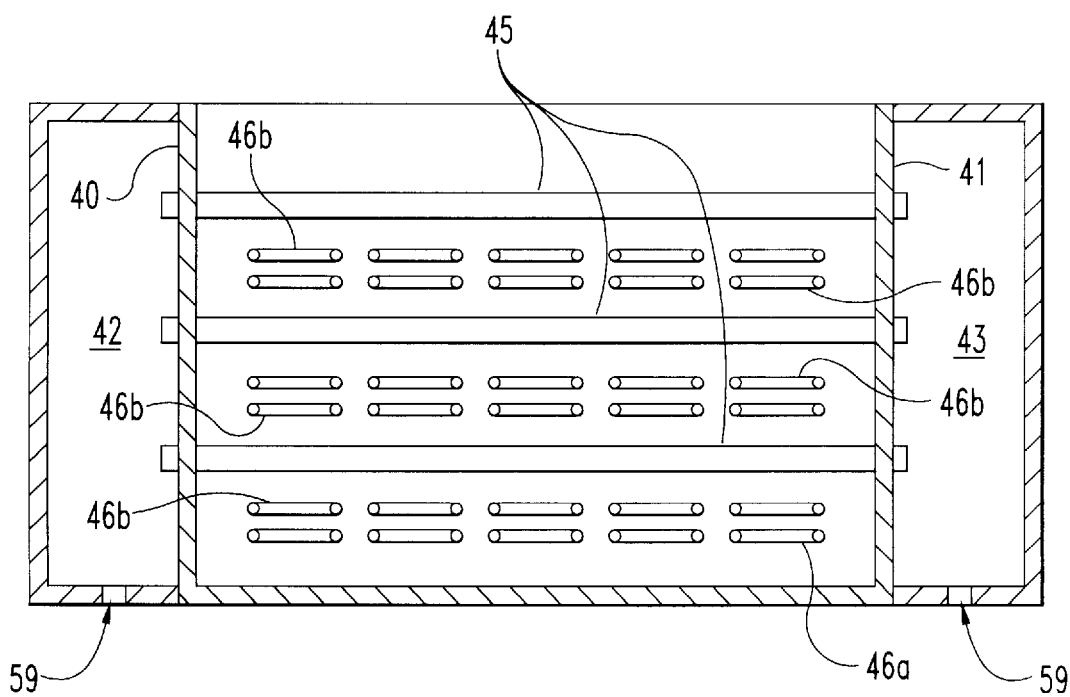
FIG. 4 is a cross-sectional view of the apparatus of FIG. 1 taken along line 4—4 and viewed in the direction of the arrows.

Referring now to FIG. 3, shown is a cross-sectional view taken along line 3—3 of FIG. 1 and viewed in the direction of the arrows. As can be seen, inner channel members 45 are mounted in rows, and coils 46a and 46b extend between the rows and substantially span the width of chamber 44. Referring to FIG. 4, shown is a cross-sectional view taken along line 4—4 of FIG. 1 and viewed in the direction of the arrows. Shown are inner channel members 45 spanning chamber 44 and mounted in interior walls 40 and 41, and opening into air discharge manifold 43 and air intake manifold 42, respectively. Again, interwoven between rows of members 45 are coils 46a and 46b. In this regard, it will be understood that the number of channel members 45 and rows of coil 46a and 46b can be varied significantly to suit a particular application.

The thermal storage and delivery apparatus 11 of the invention can be used in a variety of vehicle types, including those powered by internal combustion engines, such as tractors or passenger vehicles, those including energy storage means such as vehicles powered solely by batteries (electric vehicles, or EVs), those powered by a combination of batteries and an internal combustion engine or turbine, such as hybrid electric vehicles (HEVs), or any of these vehicle types which incorporate energy storage in a flywheel. Generally, when the vehicle includes an internal combustion engine, the apparatus 11 can be installed in a system wherein it is charged with negative or positive thermal potential when the engine is on. For instance, coils 46a or 46b can be plumbed to the vehicles' engine coolant and refrigerant loops to provide charging fluid sources for the apparatus 11. When the vehicle is an electric vehicle, for example, coil 46a may be replaced by an electric heating element or another electrically-powered source of heat, and refrigerant coil 46b may be plumbed to a dedicated charging source. In this fashion, apparatus 11 may be charged with positive or negative thermal potential during an overnight or other electrical-charging period for the vehicle in which the heating element or dedicated charging source is on.

When incorporated into an HEV, the apparatus 11 may be incorporated in a system designed to charge the apparatus 11 during operation of the internal combustion engine or turbine as described above, or during a vehicle electrical charging session, or either or both.

Figure 5:
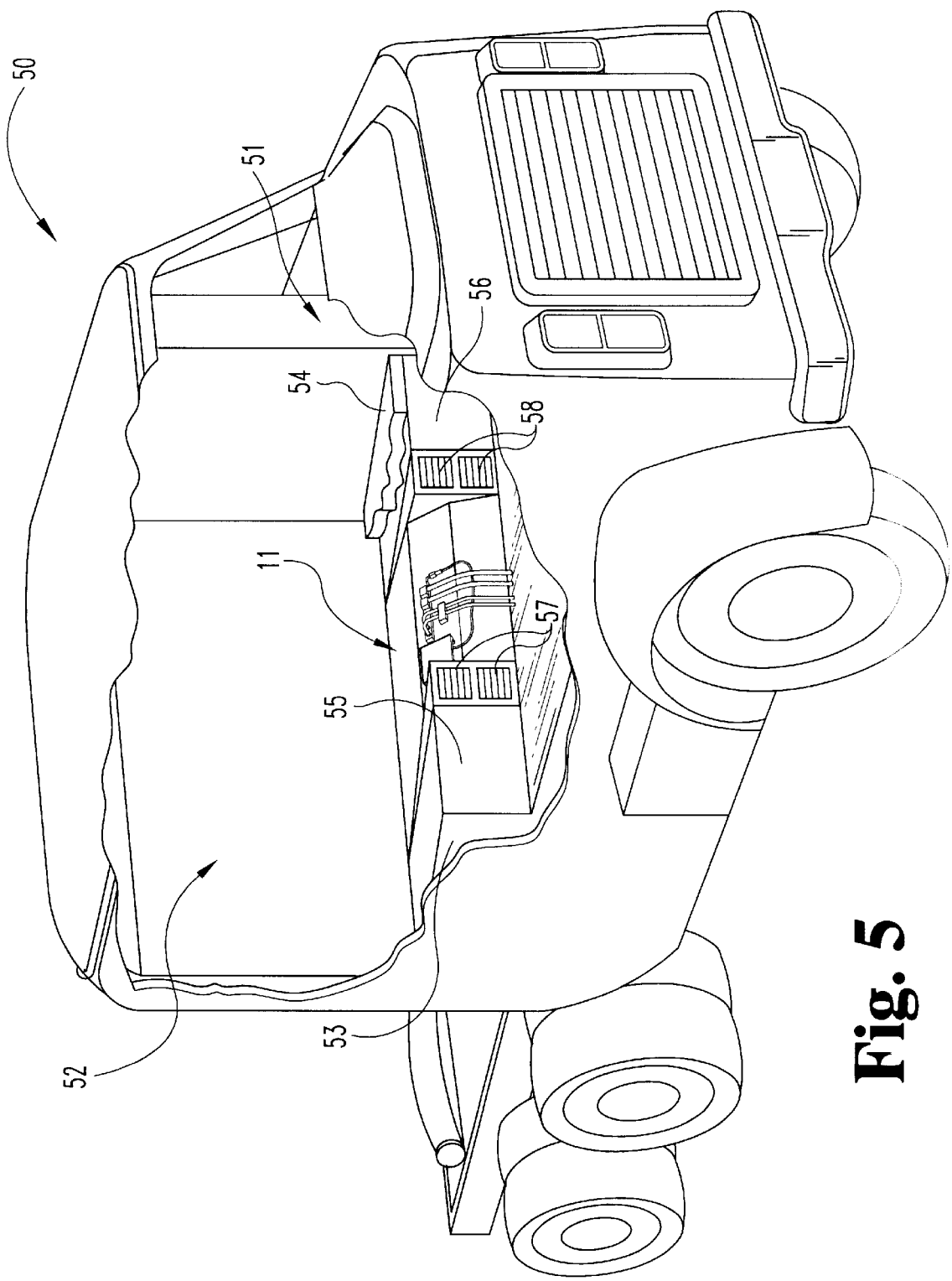
FIG. 5 is a perspective view of the apparatus of FIG. 1 installed in the rear cab space of a tractor truck.

Referring to FIG. 5, shown is a tractor 50 incorporating a thermal energy storage and delivery apparatus 11 of the invention. Tractor 50 generally includes a front cab space 51 for operation of the tractor, and a rear (sleeping) cab space 52. Space 52 includes a bunk 53 traversing the width of the sleeping space 52 and which is provided with a mattress 54 (shown cut away). Bunk 53 is divided into three cabinet spaces, including a first storage cabinet 55, a second storage cabinet 56, and a centrally-located cabinet in which is mounted apparatus 11 of the present invention. Air intake fans 24 and air discharge fans 25 (FIGS. 1 and 2) are open to rear cab space 52 to provide for effective conditioning of the environment, and if desired can be covered with flow control devices such as louvers 57 and 58 which allow for directional control of air intake and/or discharge. In the installation of device 11, the bottoms of air intake manifold 42 and air discharge manifold 43 can serve as or can hold condensation pans, and drain holes 59 can be provided. Drain lines can be fitted to drain holes 59 and routed beneath the truck to drain onto the pavement. In addition, it will be understood that insulation may be provided around apparatus 11 if desired.

Figure 6:
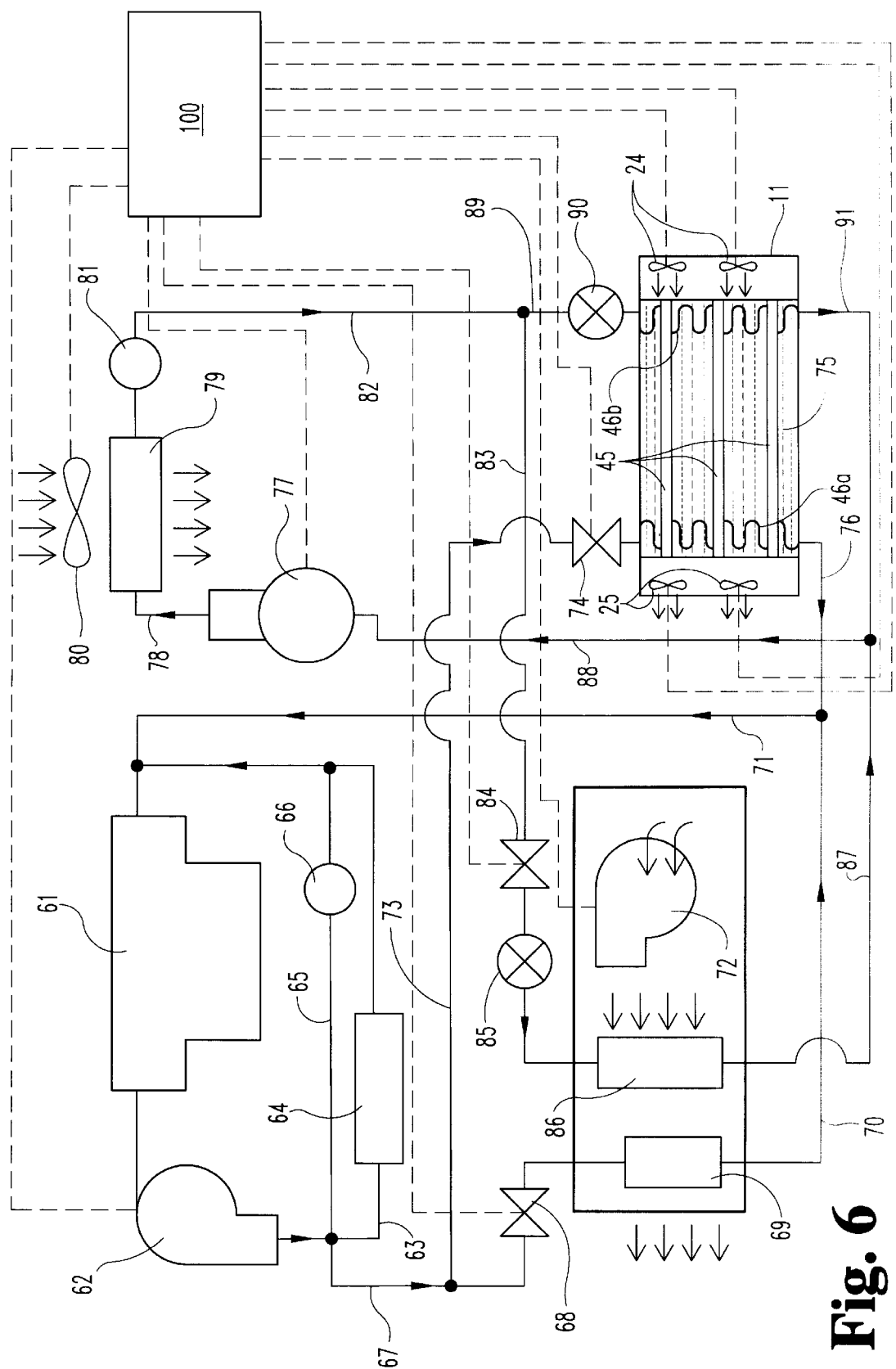
FIG. 6 is a schematic diagram of an environmental conditioning system for a vehicle incorporating a thermal energy storage and delivery apparatus of the invention.
Figure 6A:
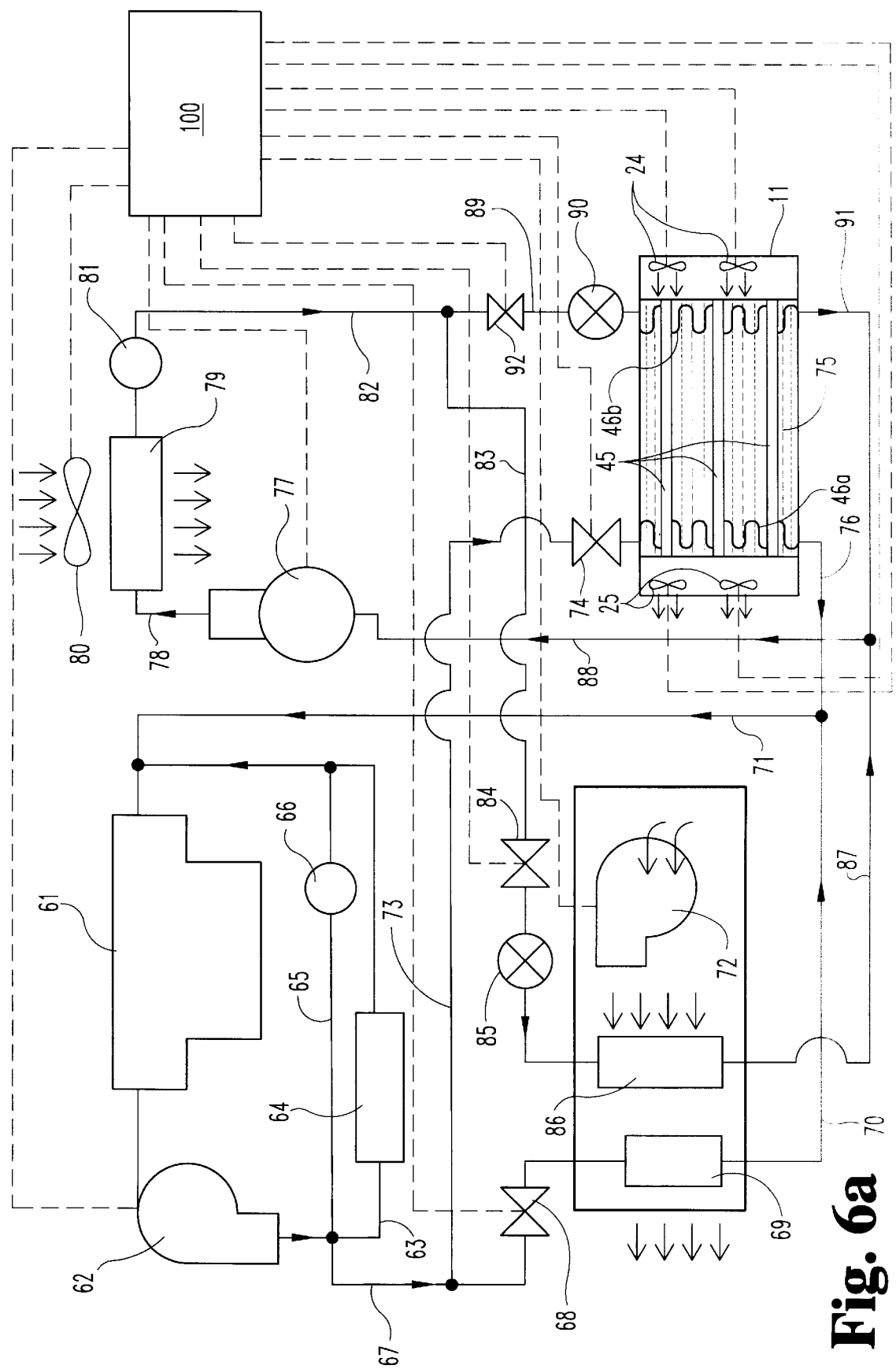
FIG. 6a is a schematic diagram of an environmental conditioning system similar to that in FIG. 6 except having an additional valve for selectively blocking refrigerant flew to the thermal storage and delivery apparatus.

Referring to FIGS. 6 and 6a, illustrative incorporations of device 11 into heating and cooling systems of a vehicle having an internal combustion engine will now be described in detail. Referring first particularly to FIG. 6, shown is a block diagram illustrating the incorporation of thermal energy storage and delivery apparatus 11 into an environmental conditioning system of a vehicle. The apparatus 11 is connected to both a first engine coolant loop and a first refrigerant loop, to provide either heating or cooling to condition an interior space of the vehicle. The first engine coolant loop includes an engine 61 through which coolant flows under the power of coolant pump 62. Coolant exiting coolant pump 62 travels through line 63 to engine radiator 64 and returns to engine 61. Coolant exiting pump 62 also travels through line 65 and to thermostat 66, which functions in the regulation of engine operating temperature. Coolant exiting pump 62 also travels through line 67 to the coolant valve 68 for the front HVAC unit. When valve 68 is open, coolant travels through heater coil 69 of the front HVAC unit, through lines 70 and 71 and back to engine 61. Blower 72 or another air moving device moves air across heater coil 69 in order to provide conditioned air, for instance to heat the front interior space of the vehicle.

Coolant exiting pump 62 also travels to a second coolant loop, including through line 73 to thermal storage coolant valve 74. When valve 74 is open, coolant passes through coolant coil 46a housed within thermal storage and delivery apparatus 11, thereby imparting heat or positive thermal potential to thermal storage medium 75 located within apparatus 11. Engine coolant then exits coolant coil 46a via line 76, and then returns to engine 61 via line 71, completing the second coolant loop.

To discharge heat from apparatus 11, fans 24 and 25 are turned on to power the flow of air through air channel members 45 housed within apparatus 11. During travel of the air through channel members, positive thermal potential is transferred from thermal storage medium 75 to channel members 45 and in turn to the air, thereby providing conditioned air exiting fans 25 which can be used to heat the front and rear space or only the rear space of the vehicle.

The first refrigerant loop includes a compressor 77 which pumps compressed refrigerant via line 78 to condenser 79 in which the refrigerant is condensed, thereby releasing heat through condenser 79. The release of heat can be aided by the operation of condensing fan 80. Refrigerant exiting condenser 79 passes to a device which filters and dries the refrigerant (a filter-dryer) 81, through line 82 and line 83 and to solenoid valve 84. When valve 84 is open, refrigerant then passes to a metering device such as a thermostatic expansion valve 85 upstream of the front evaporator 86. Expanded refrigerant exiting expansion valve 85 passes through front unit evaporator 86 in which it evaporates and absorbs heat from the surrounding environment. Thus, evaporator 86 releases "coolness" or negative thermal potential to air moving across the evaporator powered by blower 72. This cool air can be used to condition the front space of the vehicle, for example optionally after passing through devices and/or baffles arranged to mix ambient air with the cool air coming off of the evaporator (or mix ambient air with hot air coming off of the heater coil during a heating mode). Refrigerant exits evaporator 86 via line 87 and returns to compressor 77 via line 88. When solenoid valve 84 is closed, the flow of refrigerant to front evaporator 86 is interrupted.

Refrigerant exiting filter-dryer 81 also passes through a second refrigerant loop, including line 89, to thermostatic expansion valve 90 upstream of refrigerant coil 46b. Expanded refrigerant exiting valve 90 passes through refrigerant coil 46b housed within apparatus 11 wherein it is evaporated, thus providing negative thermal potential to the thermal storage medium 75 contained within apparatus 11. During the time fans 24 and/or 25 are on in a charge or discharge cycle, this negative thermal potential is in turn transferred to air channel members 45 and to air moving through channel members 45 powered by fans 24 and 25. Conditioned, cool air thereby passes through fans 25 and can be released to air condition the front and rear space or only the rear space of a vehicle.

The system illustrated in FIG. 6 can be operated in a number of cycles, including generally cooling charge and discharge, and heating charge and discharge modes, as follows.

COOLING MODE, CHARGING CYCLE:

During operation of the vehicle on the road with the engine on, if a driver is traveling alone it will be advantageous to first charge the apparatus 11. In this cycle, solenoid valve 84 of the refrigerant loop will be closed to interrupt the flow of refrigerant to evaporator 86 and fans 24 and 25 of apparatus 11 will either be off or operating at a low setting. In this manner, refrigerant circulated by the compressor 77 (which is activated) will be evaporated in refrigerant coil 46b and thus transfer negative thermal potential to the thermal storage medium 75 in apparatus 11 for storage, or if the capacity of the system is sufficient, to simultaneously store negative thermal potential and cool the interior compartment (with fans 24 and 25 on). After charging the apparatus 11 with negative thermal potential, the driver can open solenoid valve 84 to allow refrigerant to circulate to the evaporator 86 to cool with the HVAC unit in the front of the vehicle. With the thermal storage medium 75 charged and valve 84 open, refrigerant will generally not flow through line 89 to apparatus 11 because the temperature of the thermal storage medium 75 will be below the saturation temperature of the refrigerant. This will avoid unwanted lubricant deposition in coil 46b, which deposition might leave the compressor 77 unlubricated and subject to wear and damage.

With apparatus 11 in an uncharged state, to use the front HVAC to cool, it is possible to turn on at least one of fans 24 and/or 25 at a low setting to provide refrigerant flow in coil 46b to avoid lubricant deposition on the coil walls, which will also cool the rear space of the compartment. Then, during travel, solenoid valve 84 can be closed part of the time in order to charge the apparatus 11 with negative thermal potential. In addition, valve 68 may be open while valve 84 is closed, in order to heat the front space with the HVAC while storing negative thermal potential in apparatus 11.

COOLING MODE, DISCHARGING CYCLE:

Negative thermal potential stored in apparatus 11 can be discharged with the engine on or off. For example, with the engine on during travel, the rear space of the tractor cab can be cooled to maintain a comfortable temperature for a traveling companion occupying the rear space. To achieve this discharge, one or more of fans 24 and/or 25 of the apparatus 11 are turned on, either alone to cool the cab space or simultaneously with blower 72 on and valve 84 open to simultaneously cool the front and rear cab spaces.

It will be understood that during the cooling mode, charging and discharging cycles, it is desirable that solenoid valve 74 be closed in order to prevent the flow of hot engine coolant to apparatus 11, particularly when the engine is on.

HEATING MODE, CHARGING CYCLE:

Apparatus 11 is charged with positive thermal potential when the engine is on by opening solenoid valve 74 to allow coolant flow through coolant coil 46a of apparatus 11. Positive thermal potential carried by the engine coolant is thereby transferred to and stored in the thermal storage medium 75. During charge of the apparatus with positive thermal potential, valve 68 can be open in order to simultaneously operate the front HVAC unit to heat the front space of the tractor cab (with blower 72 on), or closed if operation of the front HVAC unit is not desired (blower 72 off).

HEATING MODE, DISCHARGING CYCLE:

Positive thermal potential stored in apparatus 11 can be discharged when the engine is on or off. In either case, fans 24 and/or 25 are on, thereby creating a forced air flow through air channel members 45 by which the air is heated with positive thermal potential transferred from the thermal storage medium 75.

Referring now to FIG. 6a, shown as a system similar to that depicted in FIG. 6, except also including a solenoid valve 92 positioned upstream of apparatus 11 and operable to selectively prevent or allow the flow of refrigerant to apparatus 11. Many of the heating charge and discharge cycles in the system of FIG. 6a can generally be operated similarly to those of the system of FIG. 6. However, the system of FIG. 6a can be readily operated so as to cool with the front HVAC unit while providing positive thermal potential to the thermal storage apparatus 11, whereas this cannot effectively be accomplished in the system of FIG. 6. To conduct such operation with the system of FIG. 6a, valves 92 and 68 are closed and valves 74 and 84 are open. In this manner, refrigerant circulates only to evaporator 86 of the front HVAC unit and not to apparatus 11, and engine coolant circulates only to apparatus 11 and not to heater coil 69 of the front HVAC.

It will be understood that preferred systems of the invention will include control means 100 (FIGS. 6 and 6a) for selecting among the the various options available in the heating mode, charging and discharging cycles, and cooling mode, charging and discharging cycles. Various modes provided in systems such as that depicted in FIG. 6 include:

(1) a simultaneous front/rear heating mode when the engine 61 is on, in which the compressor 77 is deactivated, the blower 72 is activated, the coolant valve 68 is open, the coolant valve 74 is open, and the fans 24 and 25 are deactivated to store substantially all of the positive thermal potential in the thermal storage medium as it is provided, activated at a low setting to deliver a portion of the provided positive thermal potential to the rear space of the compartment, or activated at a high setting to deliver substantially all of the provided positive thermal potential to the rear space;

(2) a simultaneous front/rear cooling mode when the engine 61 is on, in which the compressor 77 and the blower 72 are activated, the refrigerant valve 84 is open, the coolant valve 68 is closed, the coolant valve 74 is closed, and the fans 24 and/or 25 are activated to deliver negative thermal potential to the rear space of the compartment;

(3) a front-heating/rear-cooling mode when the engine 61 is on, in which the coolant valve 68 is open, the blower 72 is activated, the compressor 77 is activated, the refrigerant valve 84 is closed, the coolant valve 74 is closed, and the fans 24 and 25 can be deactivated to store provided negative potential in the thermal storage medium or or activated to deliver at least a portion of the provided negative potential to the rear space of the compartment;

(4) a front-heating-only mode when the engine 61 is on, in which the blower 72 is activated, the compressor 77 is deactivated, the coolant valve 68 is open, and the coolant valve 74 is closed;

(5) a front-cooling-only mode when the engine 61 is on, in which the compressor 77 and the blower 72 are activated, the refrigerant valve 84 is open, and the coolant valves 68 and 74 are closed;

(6) a rear-heating-only mode when the engine 61 is on, in which the blower 72 and the compressor 77 are deactivated, one or more of the fans 24 and/or 25 are activated, the coolant valve 68 is closed, and the coolant valve 74 is open;

(7) a rear-cooling-only mode when the engine 61 is on, in which the blower 72 is deactivated, the compressor 77 is activated, the refrigerant valve 84 is closed, the coolant valves 68 and 74 are closed, and the fans 24 and 25 are deactivated to store negative thermal potential in the thermal storage medium 75 (while not delivering any of the same to the rear space), or one or more of the fans 24 and/or 25 are activated to deliver at least a portion of the negative thermal potential provided to the thermal storage medium 75 to the rear space of the compartment (e.g. fewer than all of fans 24 and/or 25 can be activated to provide for simultaneous storage of thermal potential in the thermal storage medium and delivery of thermal potential to the rear space, or all of fans 24 and 25 can be activated to deliver essentially all of the negative thermal potential provided to the thermal storage medium 75 to the rear space).

(8) a discharge mode when the engine 61 is off, in which one or more of the fans 24 and/or 25 are activated to recover positive or negative thermal potential stored in the thermal storage medium and deliver the same to the rear space of the compartment.

The system of FIG. 6a can be controlled by the environmental control system to select, in addition to modes 1–8 above:

(9) a front-cooling/rear-heating mode when the engine 61 is on, in which the compressor 77 is activated, the refrigerant valve 84 is open, the refrigerant valve 92 is closed, the coolant valve 68 is closed, and the coolant valve 74 is open.

In each of system 6 and 6a, it is preferred that the system be arranged such that fewer than all of fans 24 and/or 25 can be activated to provide a reduced level of air flow through channel members 45 to deliver less of the thermal potential (positive or negative) to the compartment (e.g. allowing for storage of some of the thermal potential in the thermal storage medium 75), or such that more or all of the fans 24 and/or 25 can be activated to deliver more of the thermal potential to the compartment (e.g. to maximally deliver to the rear space the thermal potential provided to the thermal storage medium 75). In addition, or alternatively, fans 24 and/or 25 can be operable at multiple power settings to vary the rate of air movement through air channel members 45 to achieve a similar result. A preferred environmental control system controls the fans to achieve either or both of these functions.

While the invention has been described above in some detail, in will be understood that only the preferred embodiments have been specifically set forth, and that modifications of the illustrated apparatuses and systems will be possible without departing from the spirit and scope of the invention. In addition, all references cited herein are hereby incorporated by reference as if each had been individually incorporated by reference and fully set forth.

What is claimed is:

1. A thermal energy storage apparatus for use in a vehicular environmental conditioning system, comprising:

a housing having a chamber for containing a volume of thermal storage medium;

a first heat exchange coil for carrying coolant of a coolant system of the vehicle having a plurality of coil rows positioned to pass through a volume of aqueous thermal storage medium contained in the chamber, for conveying the coolant into heat exchange relationship with the thermal storage medium so as to impart positive thermal potential to the thermal storage medium;

a second heat exchange coil for carrying refrigerant of an air conditioning system of the vehicle positioned to pass through the volume of thermal storage medium, for conveying the refrigerant into heat exchange relationship with the thermal storage medium so as to impart negative thermal potential to the thermal storage medium;

one or more air channel members positioned to pass between said coil rows and to span the volume of thermal storage medium, for conveying air into heat exchange relationship with the thermal storage medium to extract positive or negative thermal potential from the thermal storage medium; said air channel members including a plurality of internal fin members for increasing heat exchange between air passing through the channel members and thermal storage medium contacting exterior surfaces of the channel members;

a first air manifold defined in the housing and communicating with inlet openings of said channel members, said first air manifold having an air intake opening;

a second air manifold communicating with outlet openings of said channel members, said second air manifold having an air discharge opening;

a first fan associated with the air intake opening of the first air manifold and operable to create a forced air flow into the first air manifold and into the inlet openings of the channel members; and a second fan associated with the air discharge opening of the second air manifold and operable to create a forced air flow out of the outlet openings of the channel members and out of the second air manifold.

2. The apparatus of claim 1 wherein said first and second air manifolds are configured to have increasing cross sectional dimensions in a direction extending toward their respective air intake and discharge openings.

3. The apparatus of claim 2 wherein the housing is generally rectangular in cross section, and wherein the chamber is generally trapezoidal and the first and second air manifolds are generally triangular in shape.

4. The apparatus of claim 1, wherein the housing and chamber are generally rectangular in cross section.

5. The apparatus of claim 2 or 4, which includes a plurality of said channel members.

6. A system for conditioning an environment of an interior of a vehicle, comprising:

a first source of charging fluid for carrying positive or negative thermal potential generated during a discharge cycle;

a thermal storage apparatus having a housing having an interior chamber for containing a volume of thermal storage medium;

a volume of thermal storage medium contained in the thermal storage apparatus;

a first fluid circuit passing through said volume of thermal storage medium, with said source of charging fluid being coupled to said first fluid circuit passing through said volume of thermal storage medium, for delivering said positive or negative thermal potential to the thermal storage medium;

one or more air channel members passing through and spanning said volume of thermal storage medium, said one or more air channel members including non-smooth internal surface means for increasing heat transfer between air passing therethrough and the thermal storage medium;

air moving means for powering the passage of air through said one or more air channel members, for recovering said positive or negative thermal potential from the thermal storage medium, said air moving means including at least one fan operable to push air through the one or more air channel members, and at least one fan operable to pull air through the one or more air channel members.

7. The system of claim 6, wherein the first source of fluid is engine coolant.

8. The system of claim 7, which includes a second fluid circuit passing through the thermal storage medium and coupled to a source of refrigerant from an air conditioning system of the vehicle.

9. The system of claim 6, wherein the first source of fluid is refrigerant of an air conditioning system of the vehicle.

10. The system of claim 6, wherein said first fluid circuit includes a heat exchange coil housed in said housing.

11. The system of claim 6, including:

a first air manifold communicating with inlet openings of said at least one channel members, said first air manifold having an air intake opening;

a second air manifold communicating with outlet openings of said channel members, said second air manifold having an air discharge opening;

a first fan associated with the air intake opening of the first air manifold and operable to create a forced air flow into the first air manifold and into the inlet openings of the channel members; and a second fan associated with the air discharge opening of the second air manifold and operable to create a forced air flow out of the outlet openings of the channel members and out of the second air manifold.

12. The system of claim 11, which includes a plurality of said air channel members.

* * * * *

UNITED STATES PATENT AND TRADEMARK OFFICE
CERTIFICATE OF CORRECTION

PATENT NO : 5,871,041

DATED : February 16, 1999

INVENTOR(S) : Alexander P. Rafalovich et al.

It is certified that error appears in the above-identified patent and that said Letters Patent is hereby corrected as shown below:

In col. 2, line 63, please delete "is".

In col. 14, line 11, please delete "discharge" and insert in lieu thereof --charging--.

In col. 14, line 35, please insert the following text after "members,":

-- and to push air through the one or more air channel members, --

Signed and Sealed this

Twenty-eighth Day of March, 2000

Attest:

Q. TODD DICKINSON

*Attesting Officer*

*Commissioner of Patents and Trademarks*